June 20, 1933.   T. W. ROLPH   1,914,819
PRISMATIC REFLECTOR
Filed May 29, 1929

INVENTOR.
Thomas W. Rolph
BY Joel B. Liberman
his ATTORNEY

Patented June 20, 1933

1,914,819

UNITED STATES PATENT OFFICE

THOMAS W. ROLPH, OF NEWARK, OHIO, ASSIGNOR TO HOLOPHANE COMPANY, INC., OF NEW YORK, N. Y., A CORPORATION OF DELAWARE

PRISMATIC REFLECTOR

Application filed May 29, 1929. Serial No. 366,802.

The object of this invention is the creation of a new reflecting prismatic structure in which the efficiency of the reflecting prism is increased. This increase in efficiency is caused by an increase in efficiency in certain portions of each prism of such magnitude that it more than offsets a corresponding decrease in reflective efficiency in certain other portions of such prisms. The net result is the creation of a more efficient reflecting unit than has heretofore existed.

The outer surface of the average reflecting prismatic unit is provided with a plurality of double reflecting prisms having an apex angle of substantially 90°. The interior face of the reflector is either smooth or covered with ribbings. Where greater reflective power is desired it has been known to place prisms at right angles to each other on opposed surfaces of the glass. Where such prisms were placed at other than right angles to each other the prisms on such opposed surfaces were calculated not to increase the reflective power but to spread the light and to produce a more sparkling and attractive appearance.

In the present invention the cooperating prisms or ribbings are parallel on the opposed surfaces and calculated to increase the reflective efficiency of the construction.

Figure 1:
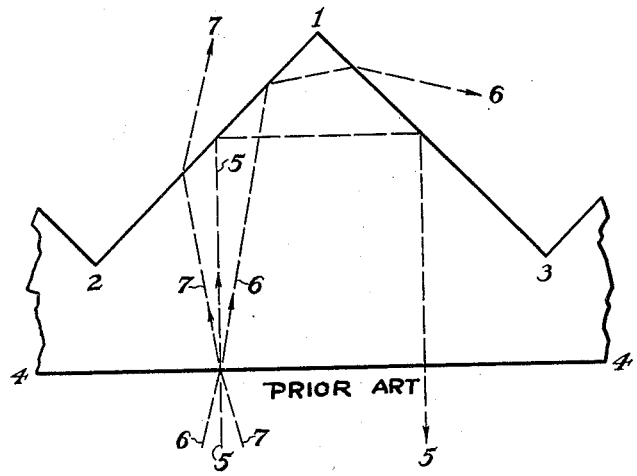
Figure 1 is a cross section of a double reflecting prism as now employed on the surfaces of prismatic glass reflectors showing typical light rays.

Figure 1 shows in cross section a typical 90° double reflecting prism, as now found in the art, the apex being at 1 and the valleys being at points 2 and 3. 4—4 represents the inner surface of the reflector on which this prism is placed. 5 represents a light ray entering the inner surface 4 reflected successively at the two surfaces of the double reflecting prism and leaving the inner surface in a direction parallel to the direction of incidence. In this figure the light ray is shown as entering the surface at normal incidence. When a light ray enters the surface at angles slightly different from the normal, reflection still occurs at the two surfaces of the prisms, but when the angle of the entering ray is more than a few degrees (the amount depending upon the index of refraction of the glass) away from normal incidence, transmission occurs at one of the two reflecting surfaces. This is illustrated by rays 6 and 7 in Figure 1.

The object of this invention is to increase the angular range of entering light within which the total reflection occurs. This object is attained by modifying the slope of the outer deflecting surfaces and providing a cooperating surface on the inside of the prismatic structure. One form of this new construction is illustrated in Figure 2.

Figure 2:
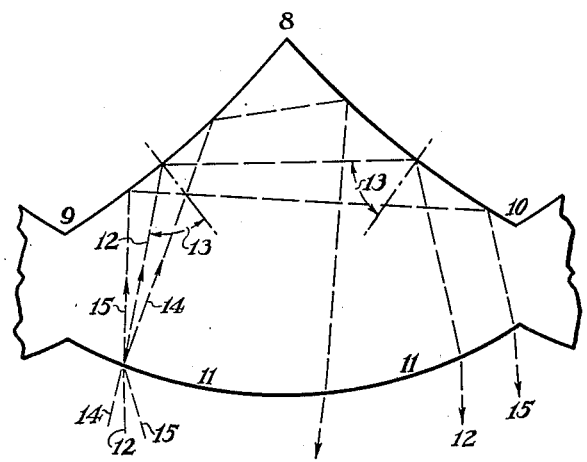
Figures 2 and 3 are cross sections of prisms made according to the present invention showing typical light rays.

In Figure 2, 8 is the apex of the prism and this is preferably a 90° angle. 9 and 10 are the valleys of the prism. 11 is the cooperating inner surface which is curved. The outer surface starts with the customary 90° apex at 8 and each side of the prism curves outward from the central axis of the prism to the valley 9 or 10. The inner surface 11 has a corresponding curvature such that an entering light ray 12, parallel to the axis of the prism, is refracted at the inner surface 11, reflected at the outer surface across the prism perpendicular to the central axis of the prism, reflected at the second outer surface at the same angle as at the first and refracted again at 11 so that it emerges from the structure in a direction parallel to the direction of entry.

It will be obvious that the angle of incidence 13, at the reflecting surfaces, is greater with the prismatic structure shown in Figure 2 than with the structure shown in Figure 1. Consequently rays of light entering at angles with ray 12 will tend to be reflected with the structure shown in Figure 2, where they would be transmitted with the structure shown in Figure 1. Thus in Figure 2 ray 14 corresponds to ray 6 in Figure 1 and tends to be reflected with the structure shown in Figure 2 where it is transmitted with the structure in Figure 1. Ray 15 in Figure 2 corresponds to ray 7 in Figure 1 and is reflected in Figure 2 where it is transmitted in Figure 1.

Figure 3:
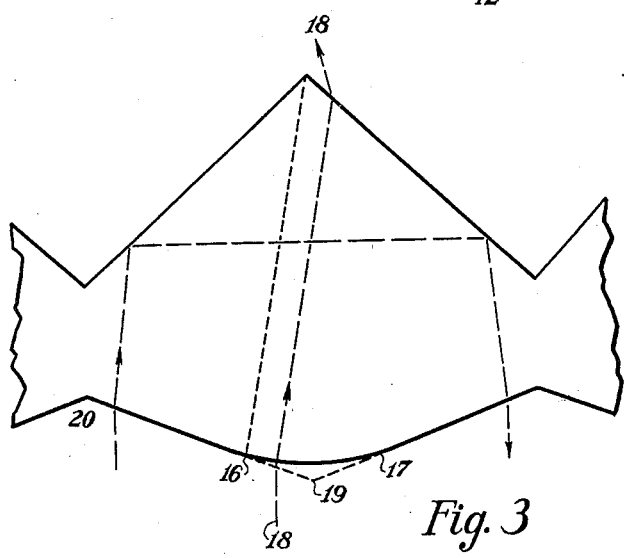

Another form of this new reflecting prism is shown in Figure 3. In this case the outer surfaces of the reflecting prism are straight in cross section and at an angle greater than 90°. The inner surface is straight throughout a large part of its length, and at an angle such that entering light will be refracted and then reflected across the axis of the prism at right angles to this axis. It will be apparent in this structure that there is a certain zone between the points 16 and 17 within which entering light rays, as for example ray 18, will be refracted across the axis of the prism and transmitted at the outer surface. If the inner surface came down to a point 19, such light would be transmitted and lost. Consequently in this variation of my invention I prefer to round the inner surface between the points 16 and 17, so that light entering normal to the general plane of the inner surface will be refracted so as to strike the outer surface on the near side of the apex of the prism. Such light will be reflected but the spread of light within which reflection occurs is less than in other parts of the prism. Consequently the light entering in the zone between 16 and 17 will not be efficiently reflected, but there will be some reflection of this light. The loss in reflecting efficiency in this zone as compared with the usual form of double reflecting prism, is more than compensated for by the gain in spread of reflected light entering between the points 16 and 20.

The construction shown in Figure 3 is usually preferable to that shown in Figure 2, because it is not as dependent upon constancy of glass thickness or prism width. The glass thickness and the prism width may be varied considerably in the construction shown in Figure 3, and produce less variation in the operation of the structure than in the case of Figure 2.

These figures have shown structures designed primarily for light which is parallel previous to entering the glass. In other words, such light theoretically proceeds from a point source at an infinite distance from the structure. In actual practice, light sources are of appreciable size and are placed at relatively small distance away from the reflecting structure, so that the light incident upon the structure is not parallel light. It is obvious that proper modifications can be made in the angles of the surfaces of my design, so as to provide for best angles of refraction and reflection for any given distance of light source from the reflecting structure.

It will also be obvious that this reflecting structure can be made in the form of plates or surfaces of whatever areas it is practical to manufacture or can be made in the form of circular reflectors or reflectors of almost any desired shape. I do not confine myself to any particular shape or size of reflecting structure because this prismatic design is general in its application.

The usual form of prismatic reflector is that in which the prisms extend radially on the reflector. Occasionally prismatic reflectors are made with the prisms extending horizontally around the reflector. In other words, the Figures 1, 2 and 3 represent cross sections of such prisms extending in any direction. However, it is sometimes desirable to make reflecting prism structures in which each reflecting prism is a cone. It will be obvious that this improvement in reflecting structure which I have described can be applied to conical reflecting prisms as well as to longitudinally extending reflecting prisms. In such conically reflecting prisms, the Figures 1, 2 and 3 shown would represent sections through the axis of the conical structure in any direction.

I claim:

1. A double reflecting prism with an opposed outwardly bulging refracting surface so curved and so spaced from the prism that entering light from a light source is refracted toward but not across the axis of symmetry of the prism.

2. A double reflecting prism with an opposed convex refracting surface of varying curvature and spaced at a distance from the reflector such that entering light from a light source is refracted in a path which would intersect the axis of symmetry of the prism at some point beyond the apex of the prism.

3. A double reflecting prism having an axis of symmetry in common with an opposed convex refracting surface of curvature varying in such a way that entering light from a light source is refracted toward but not across said axis.

4. A double reflecting prism combined with an opposed outwardly extending refracting surface so curved and so spaced from the reflecting surface that entering light from a light source is refracted toward the axis of symmetry of the prism and reflected across the axis approximately at right angles to said axis.

5. A double reflecting prism having an axis of symmetry in common with an opposed outwardly extending refracting surface so curved and so spaced from the prism that entering light from a light source is refracted toward but not across the axis and is reflected across the axis approximately at right angles to it.

6. A double reflecting prism having an axis of symmetry in common with an opposed convex refracting surface the curvature of which is such that entering light from a light source is refracted toward but not across the axis and is reflected across the axis approximately at right angles to it and then reflected from the second reflecting surface of the prism and refracted at the opposed refracting surface, so that it emerges toward the light source from which it originated.

7. A double reflecting prism having an axis of symmetry in common with an opposed refracting surface, the contours of the reflecting and refracting surfaces being so coordinated, that entering light from a light source is refracted toward but not across the axis and is reflected at the first reflecting surface across the axis approximately at right angles to it and is reflected again from the second reflecting surface.

8. A light reflector, one surface of which carries a plurality of double reflecting prisms and the other surface a corresponding number of cooperating convexities, each having a contour such that entering light from a light source is refracted toward but not across the common axis of symmetry of the prism and the convexity.

9. A double reflecting prism the surfaces of which curve away from the axis, with an opposed convex refracting surface at which entering light from a light source is refracted toward but not across the axis of the prism.

10. A double reflecting prism having an axis of symmetry in common with an opposed convex refracting surface, the reflecting surfaces of the prism curving away from the axis so that the included angle increases with the distance from the apex.

11. A prismatic reflector, one surface of the reflector having a plurality of double reflecting prisms and the other surface a corresponding number of co-operating convexities of such contour that light entering at a predetermined angle is refracted toward but not across the axis of each prism.

Signed at Newark, in the county of Licking and State of Ohio, this 24 day of May, 1929.

THOMAS W. ROLPH.